2 Sheets—Sheet 1.

G. A. REINIGER.

MACHINE FOR PUTTING WRAPPERS ON CIGARS.

No. 2,990. Reissued June 16, 1868.

2 Sheets—Sheet 2.

G. A. REINIGER.

MACHINE FOR PUTTING WRAPPERS ON CIGARS.

No. 2,990. Reissued June 16, 1868.

Inventor

Witnesses: W. Coombs. Geo. Rudel.

G. A. Reiniger
Per Munn & Co Attys

UNITED STATES PATENT OFFICE.

GEORGE MOEBS, OF DETROIT, MICHIGAN, ASSIGNEE, BY MESNE ASSIGNMENTS, OF G. ALBERT REINIGER.

IMPROVEMENT IN MACHINES FOR PUTTING ON THE WRAPPERS OF CIGARS.

Specification forming part of Letters Patent No. 33,604, dated October 29, 1861; Reissue No. 2,990, dated June 16, 1868.

*To all whom it may concern:*

Be it known that, G. ALBERT REINIGER, of Stuttgart, in the Kingdom of Würtemberg, has invented a new and Improved Machine for Putting on the Wrappers of Cigars; and I do hereby declare that the following is a full, clear, and exact description of the construction and operation of the same, reference being had to the annexed drawings, making part of this specification, in which—

Figure 1:
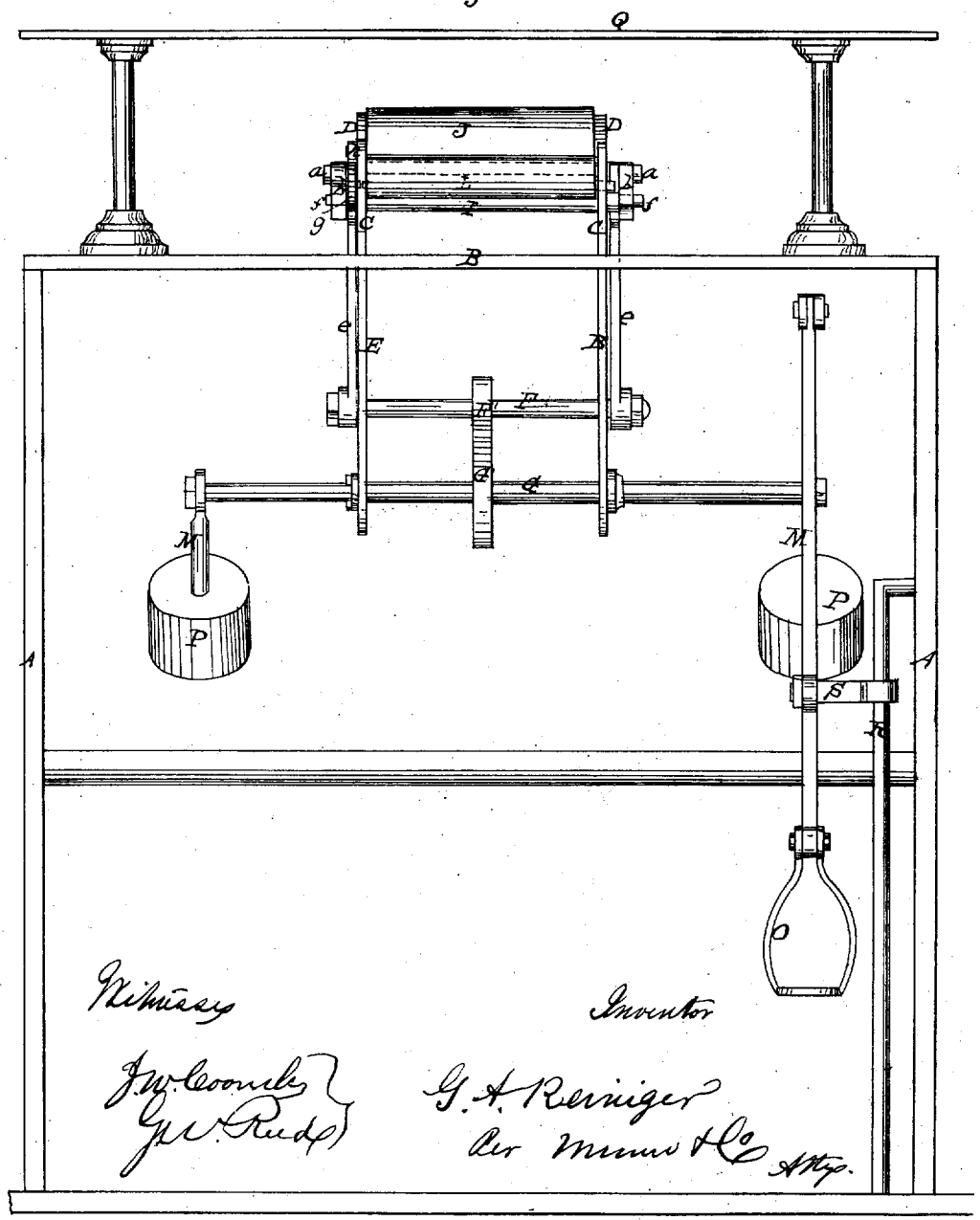
Figure 2:
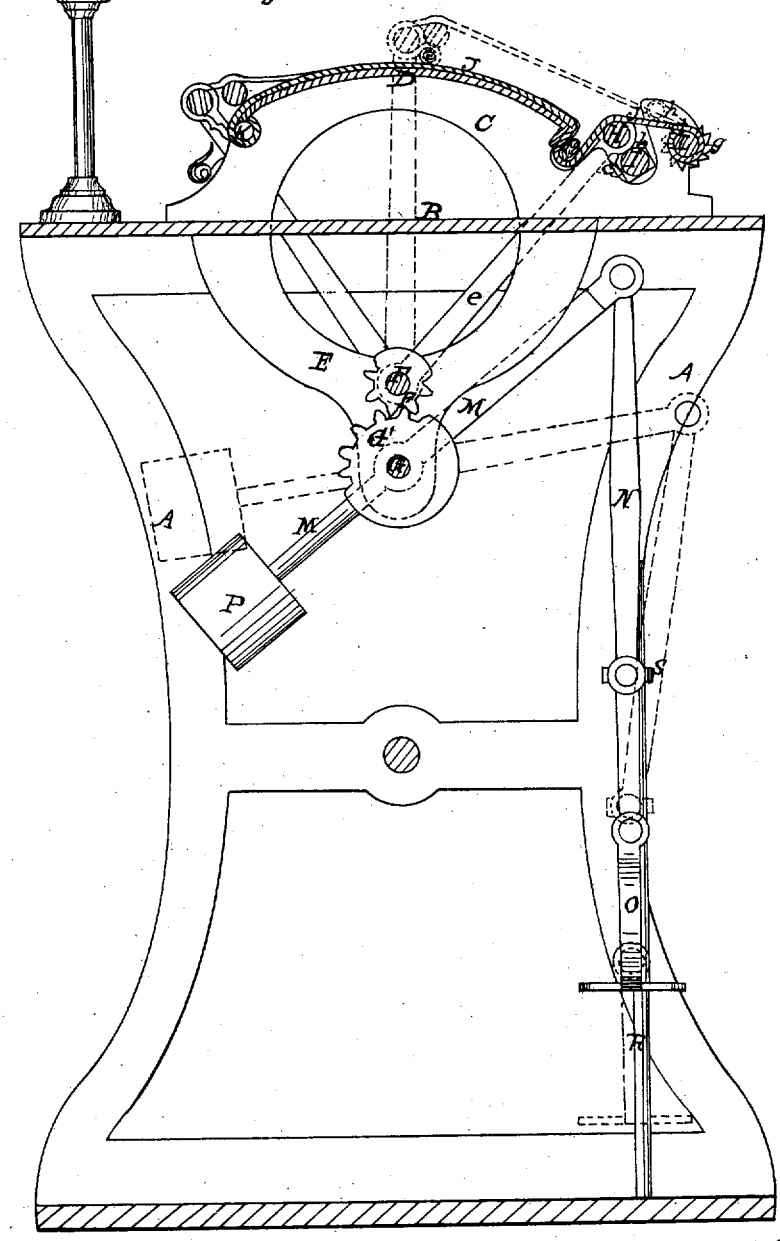

Figure 1 is a front view of the machine, and Fig. 2 is a vertical section of the same through the line *x x*, Fig. 1.

Similar letters represent the same parts in both figures.

The invention of the said G. ALBERT REINIGER consists, first, in the combination of a roller, flexible apron, and fixed table, whereby the wrapper is rolled around the bunch of tobacco of which the body of the cigar is made; second, in the employment of an auxiliary roller to give additional compactness and finish to the cigar; third, in the employment of a device for taking up the slack of the band; and, fourth, in providing hooks or their equivalents to receive the cigar as it is delivered from the machine.

To enable others skilled in the art to make and use the said invention, its construction and operation are described as follows:

A A are two upright standards, supporting a flat table, B, on the top of which there are two low standards, C C, supporting the arched table D, and below which there are two rigid hangers, E E, containing the bearings for two parallel horizontal rock-shafts, F G, arranged one above the other. These rock-shafts are geared together by toothed sectors or wheels F′ and G′, one fast upon each rock-shaft.

To the upper rock-shaft, F, there are rigidly attached, outside of the standards C C, two arms, *e e*, which contain the bearings for the roller H, which is parallel with the shaft F, and at such distance therefrom that it is carried by an oscillating movement of the said shaft over the table D at a short distance therefrom, the said table having a form very nearly resembling an arc concentric with said shaft, only deviating so much from that form that the roller in passing backward over the table will gradually arrive nearer to its surface until it has arrived near the rear edge, when it will gradually recede from the said surface.

To the journals *a a* of the roller H there may be attached, by swinging boxes *b b*, a second roller, I, whose journals *f f* fit to bearings in the said boxes, and whose axis is parallel to that of roller H. On the front of each arm *e* there is a rest, *c*, Fig. 2, for one of the boxes *b b*, which are thus prevented from falling below a certain position.

J is a flexible apron, made of inelastic india-rubber cloth, or any other strong, smooth, flexible material, secured at one end to a fixed bar, K, arranged in rear of and below the face of the arched table D, and at the other end to a roller, L, which is arranged in the front part of the said table, parallel with the roller H and rock-shafts F and G in fixed bearings in the standards C C. This roller L is furnished at one end with a ratchet-wheel, *g*, to which there is applied a pawl, *h*, attached to the adjacent standard C in such manner as to prevent the apron from unwinding from roller L, but so as to allow it to be wound up thereon by turning said roller. The apron J passes over the top of the table D, and when there is no cigar in the machine is quite slack.

M is a lever attached securely to the lower rock-shaft, G, having suspended from its front end by a rod, N, a stirrup, O, and having attached to its rear end a weight, P, which tends to raise the stirrup and turn the said rock-shaft in such a direction that by the action of the gear G′ on the gear F′ it causes the arms *e e* to be thrown forward to a position to bring the roller H to a position between the front edge of the table and the roller L. A similar weight, P′, is applied to an arm, M′, fast on the rock-shaft G, to aid the weight P in its effect.

R is a fixed vertical guide-rod attached to the adjacent standard A, to serve as a guide for a swivel-eye, S, attached to the rod M, and thereby keep the said rod from swinging about.

Q is a shaft on the back part of the table B, serving as a receptacle for the bunches of which the cigars are to be made. The wrappers may be kept on the table B.

W is one of two hooks (the other being on the other side of the machine) into which the cigar is thrown, as it is discharged from the flexible apron.

The operation of putting on the wrappers by the machine is as follows: The operator, standing in front of the machine, with his right foot resting lightly in the stirrup O, takes a properly-moistened wrapper and spreads it on the front part of the apron J, and then places a bunch upon its front part, and presses the bunch and wrapper and the slack of the apron J down into the space between the front of the table D and the roller H, while the latter is in the position shown in black outline in Fig. 2, and then presses down the stirrup O with his foot, which, through the agency of the lever M, rock-shaft G, toothed sectors G′ and F′, and rock-shaft F, causes the rollers H and I to roll over the table D and carry with them a fold of the apron and wrapper and body of the cigar, and so as to give the wrapper and bunch a rolling motion over the table D, the said rollers deriving a rolling motion from the friction of the apron, and causing the wrapper to be rolled around the bunch, the cigar being in the slack of the apron behind the roller H, which draws it forward and gives it its rolling motion, and under the roller I, which presses upon it and tends to give it greater compactness. Thus carried forward the wrapper is wound about the body of the cigar until it reaches the back of the table D, when it is thrown from the fold of the apron and caught by the hooks W. The rollers are shown in Fig. 2 in red outline, having carried the cigar about half-way over the table, and in blue outline in the act of discharging the cigar from the apron. The fold of the band is drawn tight round the cigar while passing over the table. The slightly-eccentric form of the table shown in Fig. 2 causes the cigar to be rolled gradually tighter till it arrives near the rear of the table, and afterward causes the fold of the apron to be slackened preparatory to the delivery of the cigar.

The compactness of the cigar is regulated by the degree of slackness in the apron before the rolling operation commences. Thus the slacker the band the less the compactness of the cigar, and vice versa. The apron is adjusted by the roller L before the operation, so as to give a greater or less degree of slackness as the cigar may be of larger or smaller circumference.

The table D may have a suitable concave form in a transverse direction, and the rollers H and I a suitable concave form in a longitudinal direction, to give a belly, or more or less increase of circumference to the middle of the cigar.

What is claimed herein as the invention of G. ALBERT REINIGER is—

1. The combination of the roller H, apron J, and fixed table D, the whole operating together, substantially as and for the purpose herein specified.

2. The auxiliary roller I, in combination with roller H, substantially as described.

3. In combination with the table D and apron J, the roller L, or its equivalent, adjusting the slackness of the apron, substantially as described.

4. The receiving-hooks W, or their equivalents, in combination with the table D, apron J, and roller H, for the purpose specified.

GEORGE MOEBS.

Witnesses:
SAML. S. FISHER,
MORITZ B. PHILIPP.